United States Patent [19]

Müller et al.

[11] Patent Number: 4,488,965
[45] Date of Patent: Dec. 18, 1984

[54] ARRANGEMENT FOR FASTENING FILTER CANDLES AND FILTER APPARATUS PROVIDED THEREWITH

[75] Inventors: Hans Müller, Erlenbach; Ivo Schumacher, Mannedorf, both of Switzerland

[73] Assignee: DrM, Dr. Müller AG, Mannedorf, Switzerland

[21] Appl. No.: 510,744

[22] Filed: Jul. 5, 1983

[30] Foreign Application Priority Data

Jul. 5, 1982 [CH] Switzerland ............... 4079/82
Dec. 7, 1982 [CH] Switzerland ............... 7100/82

[51] Int. Cl.³ ............................... B01D 29/32
[52] U.S. Cl. ........................ 210/232; 210/323.2; 210/460; 210/497.01; 55/374
[58] Field of Search ........... 210/323.2, 333.01, 232, 210/497.01, 236, 452, 460, 282, 345; 55/374, 376, 378; 285/325, 326, 327

[56] References Cited

U.S. PATENT DOCUMENTS

| 804,992 | 11/1905 | Anderson | 285/325 |
| 2,771,152 | 11/1956 | Bramhall et al. | 55/376 |
| 3,069,015 | 12/1962 | Hultgren et al. | 210/232 |
| 3,762,565 | 10/1973 | Okuniewski et al. | 210/460 |
| 4,098,695 | 7/1978 | Novotny | 210/323.2 |
| 4,163,724 | 8/1979 | Muller et al. | 210/323.2 |

FOREIGN PATENT DOCUMENTS 2225129 12/1973 Fed. Rep. of Germany ... 210/323.2

Primary Examiner—Richard V. Fisher
Assistant Examiner—John W. Czaja
Attorney, Agent, or Firm—Michael J. Striker

[57] ABSTRACT

An arrangement for fastening filter candles and filter apparatus provided therewith includes a collecting pipe which is composed of several T-shaped pipe pieces. Each of the pipe pieces has a substantially horizontal portion and extending therefrom a second portion which has a free end part provided with a groove. Each of the filter candles has an upper part provided with a flange portion which is engageable into the groove to obtain a tight attachment of the filter candle to the collecting pipe.

12 Claims, 7 Drawing Figures

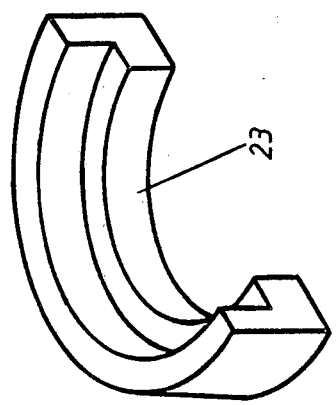
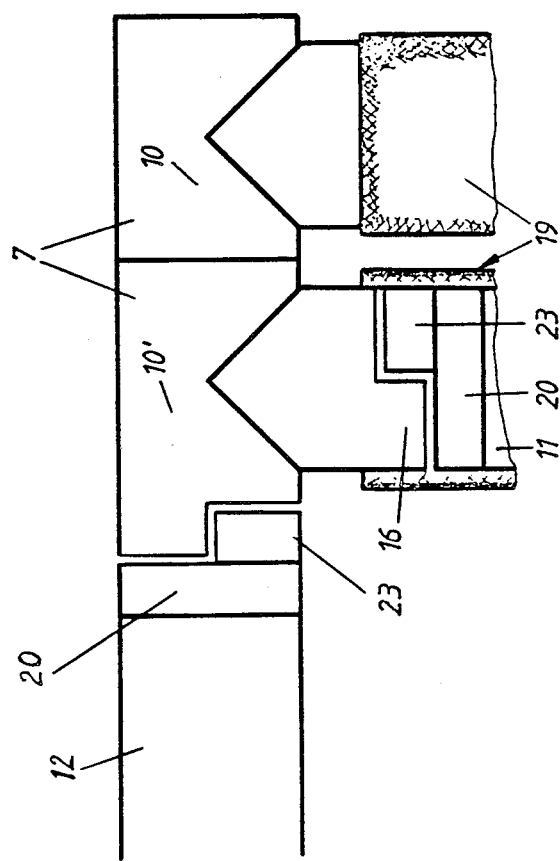

ARRANGEMENT FOR FASTENING FILTER CANDLES AND FILTER APPARATUS PROVIDED THEREWITH

BACKGROUND OF THE INVENTION

The invention relates to an arrangement for fastening filter candles and a filter apparatus provided therewith.

Fastenings for filter candles are known in which thread connections, flange connections or bayonet-type catches are used as couplings. The DE-AS No. 1,222,479 discloses a filter candle attachment in a pressure filter in which filter candles are mounted to a support plate which separates the turbidity space from the filtrate space. Each filter candle is fastened by means of a loosely insertable elastic ring as well as detachable clamping elements. Such attachments cannot be used when filter candles must be fastened to a pipe which simultaneously should serve as filtrate space as well as outlet for the cleared fluid. The other mentioned manners of attachment have the disadvantage that they are too cumbersome and therefore uneconomical in the manufacture or the use.

The CH-PS No. 607,751 describes a pressure filter which consists of a pressure container in which depending filter elements are successively arranged to removably supported hollow bodies which are parallel to each other. A number of such hollow bodies or segments are connected to a collecting pipe via filtrate outlet pipes through the upper container wall. Such segments provided with candle-like filter elements have the advantage that upon disassembling of the filter set, individual segments can be removed without necessitating removal of the entire filter set, which would be cumbersome. The segments manufactured of metal have, however, the essential disadvantage that they inherit a substantial weight and are especially expensive. This construction material renders the filter unecomical and complicates considerably the machining thereof.

SUMMARY OF THE INVENTION

It is, therefore, an object of the present invention to avoid the prior-art disadvantages.

In particular, the object of the present invention to provide an arrangement for attaching a filter candle to a collecting pipe, which arrangement is simple and stable.

Moreover, it is an object of the present invention to provide an attachment of the collecting pipe with the filter container.

A concomitant object of the present invention is to provide an attachment which is easy to obtain.

In keeping with these objects and with others which will become apparent hereinafter, one feature of the present invention resides in an arrangement for attaching a filter candle to a collecting pipe in a pressure container which comprises a T-shaped pipe piece having a substantially horizontal portion and a second portion extending therefrom, the second portion having a free end part provided with a groove; and a flange portion formed in the filter candle and engageable in the groove to obtain a tight attachment of the filter candle to the collecting pipe in the pressure container.

According to another feature of the invention, the plurality of T-shaped pipe pieces are fitted into the collecting piece wherein each of the T-shaped pipe pieces is connected to one filter candle. These pipe pieces are made of plastic material and can be fitted into one another so that a discharge collecting pipe is formed which is sufficient to receive the filtrate from the individual filter candles. The attachment between the filter candle and the collecting pipe is according to the invention covered with a bag-like tissue piece which simultaneously may serve as the actual filter tissue providing the filtration.

According to another feature of the invention, the filter candle has an upper part which comprises a candle head including a support body which has an upper portion, and a joining ring connected to the upper portion of the support body and being essentially of I-shaped cross-section so as to define a recess and the flange portion. The lower part of the second portion is constituted by a semicircular segment of L-shaped cross section so as to define a further flange portion in the groove, and cooperates with the upper part of the filter candle in such a manner that the flange portion engages in the groove of the lower part of the second portion while the further flange portion of the filter candle engages with the recess of the second portion thereby leaving open a semicircular portion in which, according to the invention, after attaching the filter candle to the collecting pipe, an insert ring is inserted to provide a smooth outer surface.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 3 illustrates schematically the attachment of the filter candle;

FIG. 7 depicts an insert ring.

DESCRIPTION OF THE PREFERRED EMBODIMENTS

Figure 1:
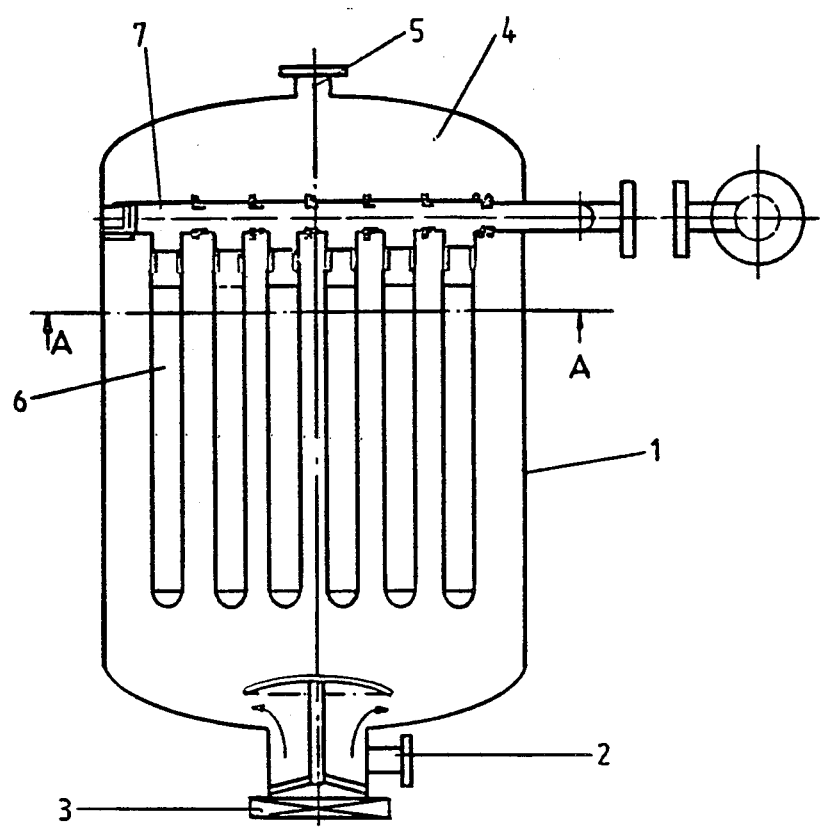
FIG. 1 is a section of a pressure candle filter.
Figure 2:
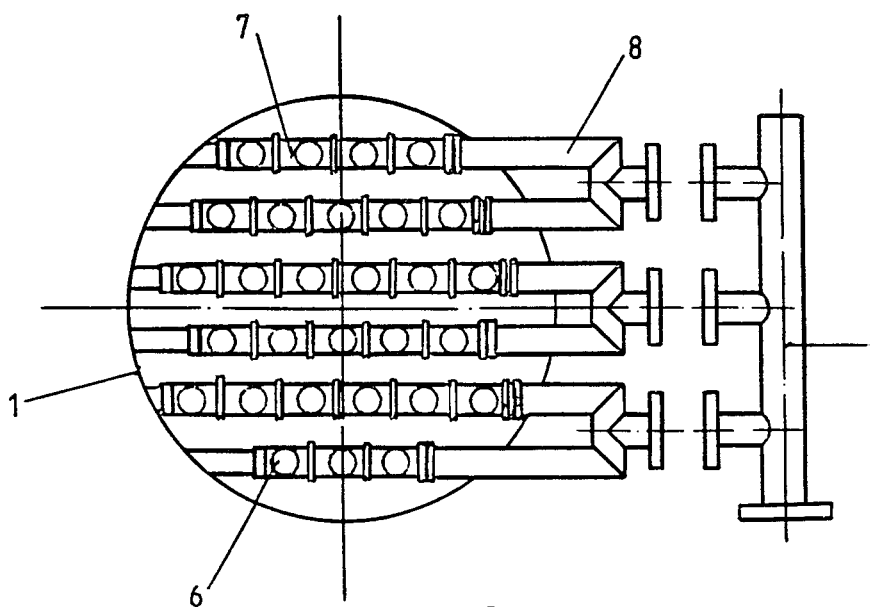
FIG. 2 is a sectional view along line A—A according to FIG. 1.
Figure 4:
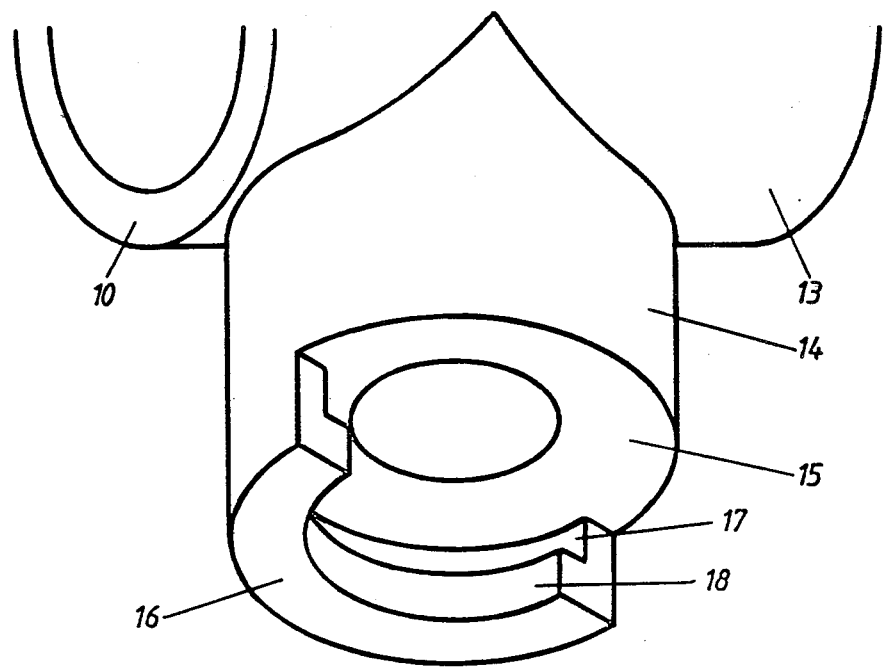
FIG. 4 shows a T-shaped pipe piece of the collecting pipe.

The filter as illustrated in FIGS. 1 and 2 includes a pressure container 1 having a lower part provided with a connecting piece 2 for receiving the fluid to be filtrated. The lower part of the pressure container 1 is further provided with a connecting piece 3 through which the filter residues like filter cake are discharged. The upper part of the pressure container has a cover 4 in which a connecting piece 5 is provided for ventilation. As can be seen especially from FIG. 2, a plurality of parallel-arranged collecting pipes 7 are provided whereby each of the collecting pipes 7 is in connection with a plurality of filter elements. For discharging of the filtrate through the side wall of the pressure container, each collecting pipe is connected to a pipe 8 which leads to a discharge pipe 9. Turning now to FIG. 3, which illustrates the attachment of the filter candles to a collecting pipe 7, it may be seen that the collecting pipe 7 consists of a plurality of T-shaped pipe pieces 10 which are welded to each other and are made of plastic material. A tight attachment of the T-shaped pipe piece 10 with a T-shaped pipe piece 10′ is obtained through fitting of the elastic plastic material of both pieces into one another.

Each pipe piece 10 consists of a horizontal portion 13 and vertically extending therefrom of a second portion 14 which has a lower part to which a support body 11 is fastened. The support body 11 can be one pipe or can be made of several individual pipes. An outlet piece 12 is provided at the container for discharging the clarified filtrate. It is to be noted that the attachment of the outlet piece 12 is provided in the same manner as the attachment of the support body 11 to the T-shaped pipe piece 10′.

Figure 5:
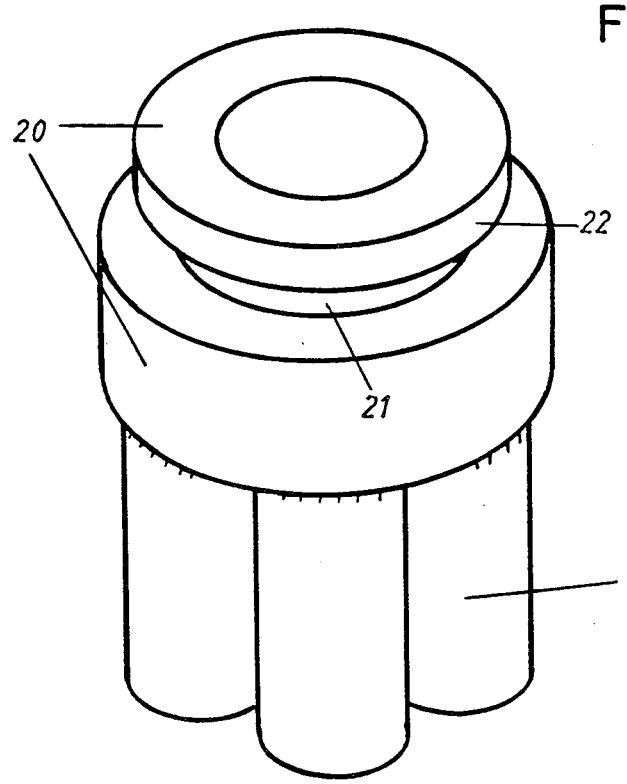
FIG. 5 shows the candle head of the filter candle.
Figure 6:
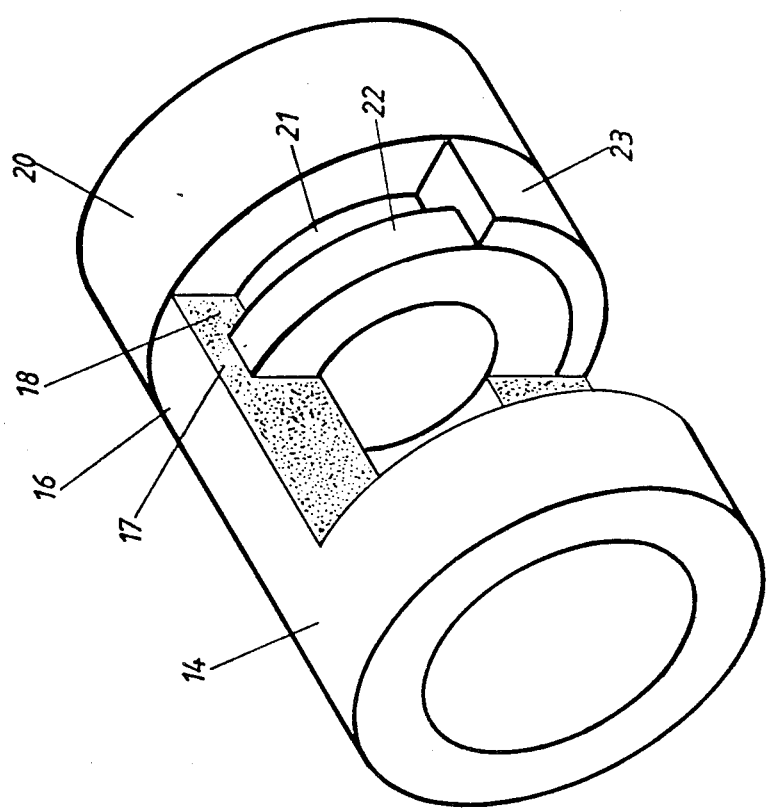
FIG. 6 is a perspective illustration of the attachment of the filter candle to the T-shaped pipe piece of the collecting pipe in an assembled state.

The second portion 14, which extends vertically from the upper horizontal portion 13, has a lower part 15 which is provided with a semicircular segment 16 of L-shaped cross section so that a groove 17 is obtained which is defined by a flange portion 18. Each of the filter candles 6 has a candle head which includes the support body 11 which, as shown in FIG. 5, includes a plurality of pipes. The support body 11 has an upper portion to which a joining ring 20 is tightly welded. The joining ring is essentially of I-shaped cross section so that a recess 21 as well as a flange portion 22 is defined. In FIG. 6, the assembled attachment is illustrated. As can be seen therefrom, the flange portion 22 of the joining ring 20 engages into the recess 17 of the second portion 14. In the groove 21 of the joining ring 20, the flange portion 18 of the second portion 14 engages therein. As the lower part 15 is connected to the semicircular segment 16, a semicircular portion is left open in which after assembling of the attachment, an insert ring 23 is inserted. The insert ring 23 provides a smooth surface and is especially shown in FIG. 7. After the T-shaped pipe piece 10 has been connected to the joining ring 20 and the insert ring 23 has been inserted, the attachment of the filter candle to the collecting pipe is tightly kept together by the elasticity of the material. The location of the coupling between the filter candle 6 and the T-shaped pipe piece 10, 10′ is covered by a tissue piece 19 which is preferably bag-like. It is to be noted, however, that the tissue piece 19 may be part of the actual filter tissue.

It will be understood that each of the elements described above, or two or more together, may also find a useful application in other types of arrangements for attaching a filter candle in a pressure container differing from the types described above.

While the invention has been illustrated and described as embodied in an arrangement for attaching a filter candle in a pressure container, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. Filter apparatus comprising:
   a container,
   a collecting pipe located within the container for discharging a filtrate,
   the collecting pipe including at least one T-shaped pipe piece; and at least one filter candle suspended in said container, said T-shaped pipe piece having a substantially horizontal portion fitted in the collecting pipe and a substantially vertical portion, said vertical portion having an end portion, said end portion being formed with a semicircular recess, said recess defining a semicircular segment-shaped projection, said semicircular segment-shaped projection being formed with a groove facing toward said recess, said candle including an upper end portion formed with a flange portion, said flange portion being circular and, upon attaching of said candle to said T-shaped pipe piece, being engaged in said groove in a form-locking manner; and an insert ring inserted into said recess in a form-locking manner after said flange portion has been engaged in said groove so as to cover said recess and provide for a smooth outer surface of said candle, whereby said candle is fastened to said T-shaped pipe piece.

2. An arrangement for attaching a filter candle to a collecting pipe of a pressure filter apparatus, comprising a T-shaped pipe piece having a substantially horizontal portion fitted in a collecting pipe of a pressure filter and a substantially vertical portion, said vertical portion having an end portion, said end portion being formed with a semicircular recess, said recess defining a semicircular segment-shaped projection, said semicircular segment-shaped projection being formed with a groove facing toward said recess, a filter candle including an upper end portion formed with a flange portion, said flange portion being circular and, upon attaching of said candle to said T-shaped pipe piece, being engaged in said groove in a form-locking manner; and an insert ring inserted into said recess in a form-locking manner after said flange portion has been engaged in said groove so as to cover said recess and provide for a smooth outer surface.

3. An arrangement as defined in claim 2, wherein a plurality of T-shaped pipe pieces are formed in the collecting pipe, each of the T-shaped pipe pieces being connected to one filter candle.

4. An arrangement as defined in claim 3, wherein the individual T-shaped pipe pieces are welded together.

5. An arrangement as defined in claim 3, wherein the individual T-shaped pipe pieces are fitted to one another.

6. An arrangement as defined in claim 2, wherein the T-shaped pipe piece is of plastic material.

7. The arrangement as defined in claim 2, wherein said candle has a support body welded to said upper end portion.

8. An arrangement as defined in claim 7, wherein the support body is made of at least one pipe.

9. The arrangement as defined in claim 2, wherein said segment-shaped projection is formed with a further flange portion so that said groove and said further flange portion define an L-shaped cross-section of said projection, said upper end portion of the candle being formed with a further groove, said further flange being engaged in said further groove whereby said upper end portion of the candle is insertable through said semicircular recess into said first mentioned groove leaving said recess open, and said insert ring covering said recess from outside.

10. An arrangement as defined in claim 2, wherein the vertical and end portions of the T-shaped pipe, the insert ring, and the upper end portion of the filter candle have outer surfaces covered by a tissue.

11. An arrangement as defined in claim 10, wherein the tissue is bag-like.

12. An arrangement as defined in claim 10, wherein the tissue is part of a filter tissue providing the filtration.

* * * * *